(12) United States Patent
Meurant et al.

(10) Patent No.: US 12,710,732 B2
(45) Date of Patent: Aug. 18, 2026

(54) METHODS AND SYSTEMS FOR AUTOMATICALLY CONFIGURING AN ELECTRICAL MICRONETWORK

(71) Applicant: Schneider Electric Industries SAS, Rueil Malmaison (FR)

(72) Inventors: Olivier Meurant, Saint Martin d'Heres (FR); Florent Aubert, Crolles (FR); Jean Wild, Coublevie (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 17/518,055

(22) Filed: Nov. 3, 2021

(65) Prior Publication Data

US 2022/0147004 A1 May 12, 2022

(30) Foreign Application Priority Data

Nov. 6, 2020 (FR) ...................................... 2011419

(51) Int. Cl.
*G05B 19/042* (2006.01)

(52) U.S. Cl.
CPC .. *G05B 19/042* (2013.01); *G05B 2219/23067* (2013.01); *G05B 2219/2639* (2013.01); *G05B 2219/2642* (2013.01)

(58) Field of Classification Search
None
See application file for complete search history.

(56) References Cited

U.S. PATENT DOCUMENTS 8,421,270 B1 * 4/2013 Miller ..................... H02J 3/381 307/65
8,447,435 B1 * 5/2013 Miller ....................... H02J 3/06 700/297

(Continued)

FOREIGN PATENT DOCUMENTS

CN 206442123 U 8/2017
CN 107240934 A 10/2017

(Continued)

OTHER PUBLICATIONS

Tarchini, Introduction to Stateflow (For MATLAB), slides 1-32 (Year: 2019).*

(Continued)

*Primary Examiner* — Jason Lin
(74) *Attorney, Agent, or Firm* — Kinney & Lange, P.A.

(57) ABSTRACT

A method for automatically configuring an electricity distribution microgrid includes:

acquiring technical data describing properties of the microgrid, notably a topology of the microgrid, and properties of at least some of the electrical equipment connected to the microgrid, by way of a software configuration tool implemented by a remote computer server;

automatically generating a set of executable software functions making it possible to automatically drive the equipment of the microgrid, by taking account of the properties of the microgrid acquired by the configuration tool; and automatically installing the software functions generated on an electronic controller belonging to a microgrid control system, the controller being connected to the equipment via a communication link.

11 Claims, 4 Drawing Sheets

(56) References Cited

U.S. PATENT DOCUMENTS 8,923,993 B2 * 12/2014 Kulathu ............. G05B 19/0426 700/83
10,211,630 B1 * 2/2019 Clidaras .................... H02J 1/12
10,784,690 B2 * 9/2020 Brombach ................ H02J 3/14
2005/0190725 A1 * 9/2005 Wakisaka ............. H04B 7/0808 375/343
2011/0276192 A1 * 11/2011 Ropp ................ H02J 13/00002 700/297
2011/0282507 A1 * 11/2011 Oudalov .................. H04B 3/54 700/292
2012/0175955 A1 * 7/2012 Carralero ................ H02J 9/062 307/65
2012/0191440 A1 * 7/2012 Meagher ................. G06F 30/00 703/18
2012/0245744 A1 * 9/2012 Prosser ..................... H02J 3/32 700/286
2013/0155734 A1 * 6/2013 El-Barbari .............. H02J 3/381 363/55
2013/0187454 A1 * 7/2013 Timbus ................... H02J 3/388 307/23
2014/0046498 A1 2/2014 Nakayama
2014/0129040 A1 * 5/2014 Emadi .................... G06Q 50/06 700/291
2015/0094871 A1 4/2015 Bhageria et al.
2015/0160670 A1 * 6/2015 Meliopoulos ..... H02J 13/00001 700/291
2016/0233682 A1 * 8/2016 Do Rosario ............ H02J 3/003
2016/0254666 A1 * 9/2016 Curtiss .................. H02J 3/0073 700/292
2016/0285268 A1 * 9/2016 Majumder .............. H02J 3/472
2017/0046458 A1 * 2/2017 Meagher ................. H02J 13/00
2018/0301903 A1 * 10/2018 Majumder ............ H02J 7/0029
2019/0148941 A1 * 5/2019 Wang ........................ H02J 3/38 700/287
2021/0006427 A1 1/2021 Fargier

FOREIGN PATENT DOCUMENTS

CN 107390547 A * 11/2017 ............. G05B 17/02
CN 111221266 A * 6/2020
CN 111600330 A * 8/2020
EP 3032470 A1 6/2016
WO 2013049547 A2 4/2013
WO 2013083656 A2 6/2013
WO 2019043222 A1 3/2019

OTHER PUBLICATIONS

Fan et al. "Multiple Time-Scale Optimization Scheduling for Microgrids", 2019, IEEE, pp. 1-6 (Year: 2019).*

French Search Report and Written Opinion dated Jun. 23, 2021 for corresponding French Patent Application No. 2011419, 7 pages.

* cited by examiner

METHODS AND SYSTEMS FOR AUTOMATICALLY CONFIGURING AN ELECTRICAL MICRONETWORK

TECHNICAL FIELD

The present description relates to the field of electricity distribution grids, and pertains more particularly to microgrids.

BACKGROUND

Microgrids are generally used in residential, commercial or industrial buildings, or even in groups of buildings, to locally produce and store electricity, while also being able to be connected to a public electricity distribution grid.

Microgrids make it easier to use distributed energy sources, and more particularly to use renewable energy sources, such as wind turbines, hydrokinetic turbines or photovoltaic panels. Microgrids may also comprise energy storage devices, such as batteries, and may also accommodate dynamic and reversible electrical loads, such as electric motor vehicles connected to a charging terminal. Microgrids may advantageously be used to provide a stable and continuous electricity supply when the public grid is not sufficiently reliable.

A control system typically makes it possible to drive and to automate the operation of the microgrid, for example in order to connect or disconnect loads and/or electric power sources, for example in response to the occurrence of an electrical fault, or on the basis of the evolution of energy demand and/or on the basis of the availability of the power sources, or even when the microgrid is disconnected from the main grid.

This driving may be performed using a control device comprising a programmable logic controller (PLC), or else an industrial personal computer (IPC), interfaced, within the microgrid, with various elements, such as protection devices or switching devices, with power sources and electrical loads, this interfacing being able to be achieved for example by way of a communication network such as an industrial data bus.

One drawback is that such microgrids are complex to install and to configure. For example, it is necessary to provide settings involving multiple additional parameters for each protection device, and to calculate specific protection plans, this taking up far more time for installers and engineers responsible for installation and maintenance and requiring far more advanced or uncommon skills than those required for commissioning conventional distribution installations. This is due in particular to the highly decentralized nature of microgrids, and the fact that certain elements may be connected or disconnected dynamically. It is therefore not always possible to configure a microgrid based on a generic and static installation plan, as might be the case with traditional grids.

This complexity may be an obstacle to the deployment of new microgrids.

In addition, an installation configured by insufficiently qualified staff may lead to malfunctions, or even to serious safety problems.

There is therefore a need for methods and systems for rapidly and easily configuring an electricity distribution microgrid.

SUMMARY

To this end, according to one aspect of the invention, a method for automatically configuring an electricity distribution microgrid comprises:

- acquiring technical data describing properties of the microgrid, notably a topology of the microgrid, and properties of at least some of the electrical equipment connected to the microgrid, by way of a software configuration tool implemented by a remote computer server;
- automatically generating a set of executable software functions making it possible to automatically drive the equipment of the microgrid, by taking account of the properties of the microgrid acquired by the configuration tool;
- automatically installing the software functions generated on an electronic controller belonging to a microgrid control system, this controller being connected to said equipment via a communication link.

According to some advantageous but non-mandatory aspects, such a method may incorporate one or more of the following features, taken alone or in any technically permissible combination:

- the generated software functions are configured, when they are executed by the controller, to ensure the stability of the microgrid in terms of frequency and in terms of voltage, in particular when the microgrid operates in isolated mode.
- the generated software functions are configured, when they are executed by the controller, to drive electrical protection devices installed in the microgrid.
- the generated software functions are configured, when they are executed by the controller, to automatically manage the sequences of operations to be implemented to change from an isolated mode, in which the microgrid is disconnected from an electricity distribution grid, to a connected mode, in which the microgrid is connected to an electricity distribution grid.
- the method furthermore comprises a step of automatically generating a second set of algorithms that make it possible to optimize the consumption of the microgrid when the microgrid is connected to an electricity distribution grid.
- the method furthermore comprises a step of automatically creating a human/machine interface on the basis of the acquired data.
- the method furthermore comprises automatically generating parameters for configuring the communication link on the basis of the acquired data.
- the electrical equipment connected to the microgrid comprise one or more reversible electrical loads and/or one or more energy storage devices and/or one or more renewable energy production devices.
- the electronic controller is a programmable logic controller or an industrial personal computer.

According to another aspect, a system for automatically configuring an electricity distribution microgrid comprises:

- a software configuration tool implemented by a remote computer server;
- a microgrid control system, comprising an electronic controller connected to electrical equipment of the microgrid via a communication link;

and wherein the configuration system is programmed for:

- acquiring technical data describing properties of the microgrid, notably a topology of the microgrid, and properties of at least some of the electrical equipment connected to the microgrid, by way of a software configuration tool implemented by a remote computer server;
- automatically generating a set of executable software functions making it possible to automatically drive the equipment of the microgrid, by taking account of the properties of the microgrid acquired by the configuration tool;

automatically installing the software functions generated on an electronic controller belonging to a microgrid control system, this controller being connected to said equipment via a communication link.

BRIEF DESCRIPTION OF THE DRAWINGS

The invention will be better understood and other advantages thereof will become more clearly apparent in the light of the following description of one embodiment of such a method, provided solely by way of example and given with reference to the appended drawings, in which.

DETAILED DESCRIPTION

Figure 1:
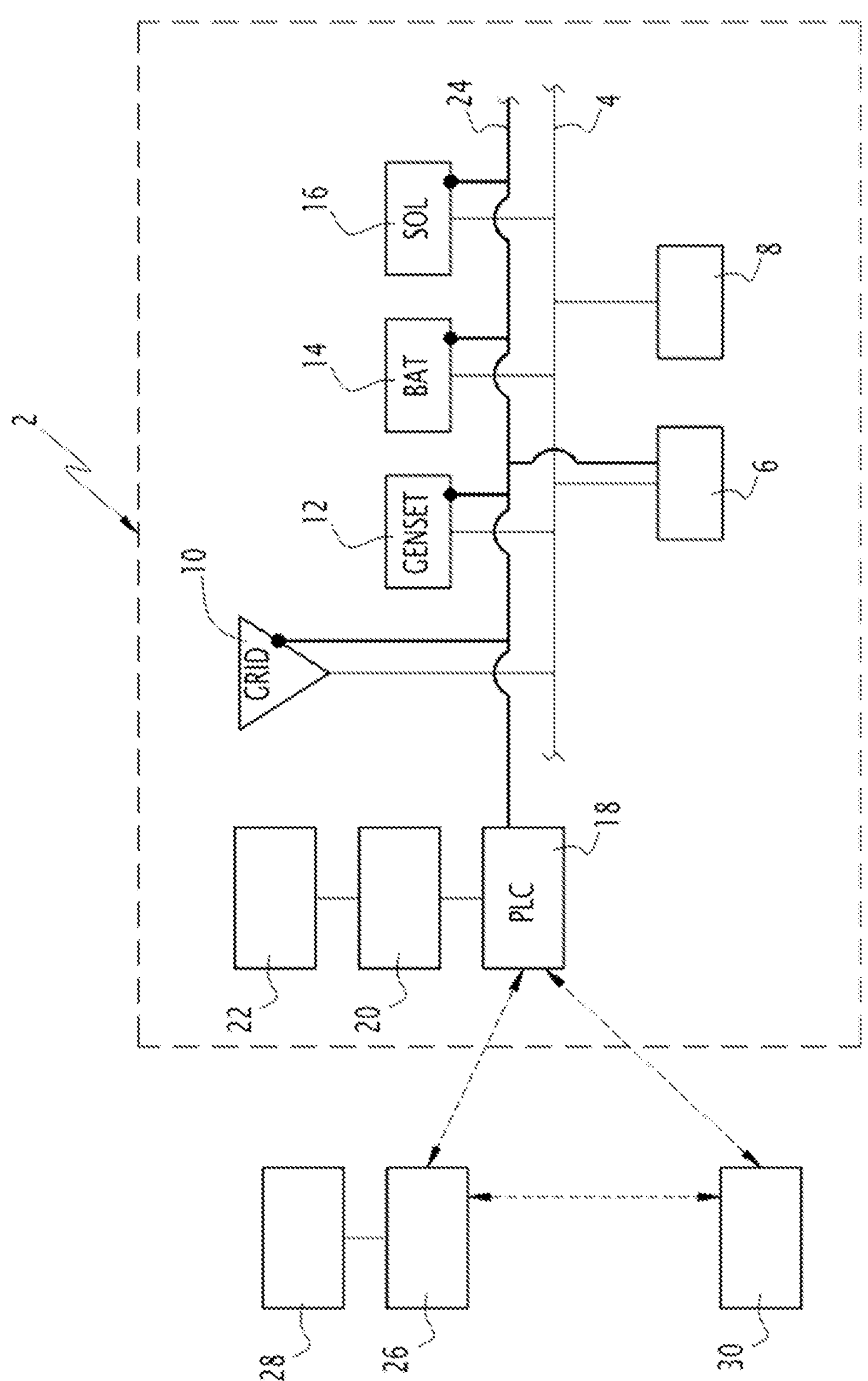
FIG. 1 is a schematic depiction of an example of an electrical distribution microgrid.

An example of an electricity distribution microgrid is illustrated in FIG. 1.

In many embodiments, the microgrid 2 is an electricity distribution installation comprising electrical conductors 4 that make it possible to connect electrical loads 6, 8 and local electrical energy sources.

For example, the electrical loads 6, 8 and the electrical energy sources comprise electric power inputs and/or outputs that are connected to one or more electrical conductors 4, preferably via connection interfaces comprising one or more electrical switching devices and/or one or more electrical protection devices.

According to various embodiments, the microgrid 2 may be used to distribute DC electric currents or AC electric currents. As the case may be, the electric currents that are distributed may be single-phase or polyphase.

In many cases, the loads 6, 8 may be classified into two categories: a first group corresponding to dynamic or even reversible electrical loads that are able to be driven and are able to be disconnected on demand, for example on demand from the microgrid 2, and a second group corresponding to electrical loads that are not able to be disconnected on demand and/or that have to stay supplied with power at all times by the microgrid 2.

For example, the electrical loads 6 that are able to be disconnected are reversible electrical loads, that is to say electrical loads that are able to alternately consume electricity provided by the microgrid 2 and return electricity to the microgrid. This is the case for example for rechargeable electric vehicles connected to a recharging terminal supplied with power by the microgrid 2.

However, this distinction may be omitted in some embodiments. As a variant, the microgrid 2 could comprise electrical loads of just one of the two types presented above.

In many embodiments, the microgrid 2 may be connected to an electricity distribution grid 10 (denoted "GRID" in FIG. 1, and called "main grid" hereinafter), which may be a public grid.

The microgrid 2 may preferably be selectively connected to the grid 10 or disconnected from the grid 10, for example by way of remotely driveable electrical switching devices.

The microgrid may then operate in various operating modes depending on whether it is connected to the grid 10 or disconnected from the grid 10. It is possible for example to define a connected operating mode and a disconnected operating mode, each possibly comprising different operating routines and driving strategies.

According to one example, the microgrid 2 is configured, when it is disconnected from the grid 10, to allow power to be supplied to the electrical loads 6 and 8 on the basis of the electrical energy produced by the local sources.

In many embodiments, the energy sources connected to the microgrid 2 are able to generate electricity, or to output stored electrical energy, or to convert electrical energy from another energy source, and may be active continuously or intermittently depending on their type. In practice, these electrical energy sources allow decentralized electricity production.

In the example illustrated, which is given primarily for explanatory purposes and which is not intended to limit the application just to this embodiment, the microgrid 2 comprises a conventional generator 12 (denoted "GENSET" in FIG. 1), an energy storage device 14 (denoted "STOR") and a renewable energy source 16 (denoted "SOL").

The conventional generator 12 may for example be a generator set, or a generator comprising a gas turbine, or a fuel cell.

The storage device 14 may comprise a battery, for example an electrochemical accumulator battery, and/or other electricity storage means, such as supercapacitor batteries, or kinetic energy storage devices, such as flywheels, or even hydrogen storage devices.

The renewable energy source 16 may for example comprise a solar panel, this solar panel being able to be combined with an inverter or with any appropriate electrical conversion equipment.

As a variant, the energy sources could include other electricity generation means based on what are known as renewable energies, such as wind turbines, or biomass boilers, or geothermally supplied generators, or hydraulic turbines, or any appropriate means.

It is easily conceivable in practice for the number and type of the electrical sources of the microgrid 2 to be able to be different from those described here, both in terms of their type and in terms of their number or their arrangement in the microgrid 2.

In many implementations, according to the circumstances, the microgrid 2 may be driven so that at least some of the electrical energy produced by the local sources is transmitted to the grid 10.

When necessary, the microgrid 2 may also be driven so that electrical energy from the grid 10 is used to supply all or some of the electrical loads 6, 8, for example when the production of electricity within the microgrid 2 by the local sources is insufficient to meet local demand.

In many embodiments, the microgrid 2 also comprises electrical devices for managing and regulating the electric power flowing in the microgrid 2, such as electrical protection devices and/or switching devices and/or power converters.

The microgrid 2 may also comprise sensors and/or measuring devices configured to measure electrical variables (voltages, currents, active and reactive electric powers, etc.) or environmental variables (temperature, humidity, etc.).

These switching devices, like the loads and the electrical sources, may be driven so as to ensure the stability (in terms of frequency and/or in terms of voltage) of the microgrid 2. For example, depending on measured operating conditions and/or imposed operating policies, instructions may be sent to the equipment, for example to vary the consumed electric power or the produced electric power, or to vary a reactive electric power.

The microgrid 2 may furthermore be configured to detect the occurrence of an electrical fault and, in response, to disconnect all or some of the electric power sources and/or the electrical loads in order to protect the installation and/or to make it possible to isolate the fault and/or to locate the origin of the fault.

In general, in order to perform all or some of the driving functions presented above, the microgrid 2 comprises a control system comprising at least one electronic controller 18, such as a programmable logic controller (or PLC), or else an industrial personal computer.

For example, the control system also comprises a user terminal 20 connected to the controller 18 and comprising a user interface 22.

In many embodiments, the user terminal 20 is a computer, such as an industrial computer or a workstation.

The user interface 22 is for example capable of displaying a graphical interface, and may comprise data entry instruments such as a keypad, a pointer, a touchscreen, a mouse or any equivalent element.

The user interface 22 may also comprise one or more data acquisition devices, such as a disc reader, or a wired connector, or a wireless communication interface, for downloading data from another local device, such as a mobile device carried by the operator.

The electronic control device (and more particularly the controller 18) is connected to at least some of the electrical equipment of the microgrid 2 via a communication link 24.

The communication link 24 may comprise a wired network, or a data bus, in particular an industrial data bus, or a plurality of point-to-point links, or else wireless links.

According to one example given for illustrative purposes, the communication link 24 may comprise a Modbus data bus, but other alternatives could be used as a variant.

In practice, the communication link 24 may be used by the controller 18 to send orders aimed at connecting or disconnecting certain equipment of the microgrid 2.

For example, the link 24 is connected to switching devices such as relays, and/or circuit breakers, and/or commutators, and/or switches and/or disconnectors, which may thus be activated remotely by the controller 18 in order to selectively disconnect or reconnect one or more items of equipment, for example in order to disconnect an electrical load 6, or in order to disconnect the microgrid 2 from the grid 10.

In many cases, some of this equipment (electrical loads or sources) may integrate electrical switching means able to be driven by an embedded electronic controller. In this case, the communication link 24 may be connected to these local controllers, and thus directly drive the local electrical switching means without necessarily calling upon a switching device that may be located outside this equipment (that is to say at the interface between the equipment and the conductors 4).

The link 24 may also be used to transmit, to the controller 18, data measured by sensors, or data generated by the connected equipment, and relating to measured electrical variables and/or information about the internal state of equipment of the microgrid 2.

According to some modes of implementation, the controller 18 comprises a processor, such as a programmable microcontroller or a microprocessor, and a memory forming a computer-readable data recording medium.

For example, the memory is a read-only memory (ROM), or a random-access memory (RAM), or a non-volatile memory such as an EPROM, or EEPROM, or FLASH, or NVRAM, or equivalent, or an optical or magnetic recording medium, or any appropriate technology.

The memory in this case comprises executable instructions or software code modules that are preferably designed to allow the microgrid 2 to perform operations required for it to operate, and in particular to implement methods as described in the following examples when these instructions are executed by the processor.

In many embodiments, the executable instructions or the software code modules are compatible with the IEC 61131 standard, part 3.

The use of the term "processor" does not rule out, as a variant, at least some of the functions of the controller 18 being performed by a signal processing processor (DSP), or a reprogrammable logic component (FPGA), or an application-specific integrated circuit (ASIC), or any equivalent element.

The control device (and in particular the controller 18) may comprise a communication interface for communicating, for example through a computer network such as the Internet, with a remote computer terminal 26, such as a computer, or a workstation, or a mobile communication device such as a digital tablet, or any equivalent device, this terminal 26 being able to be used to configure the microgrid or to monitor it remotely.

The terminal 26 may comprise a user interface 28, for example analogous to the user interface 22, while being capable of displaying a graphical interface and possibly comprising data entry and/or data acquisition instruments.

The control device (and in particular the controller 18), like the terminal 26, may also communicate with a remote computer server 30, in this case too for example through a computer network such as the Internet.

For example, the terminal 26 and the server 30 each comprise one or more processors configured to implement all or some of the steps described below.

The use of the term "computer server" does not prevent, in some embodiments, the corresponding functionalities of the server being implemented by a software service hosted on a "cloud computing" platform.

Figure 2:
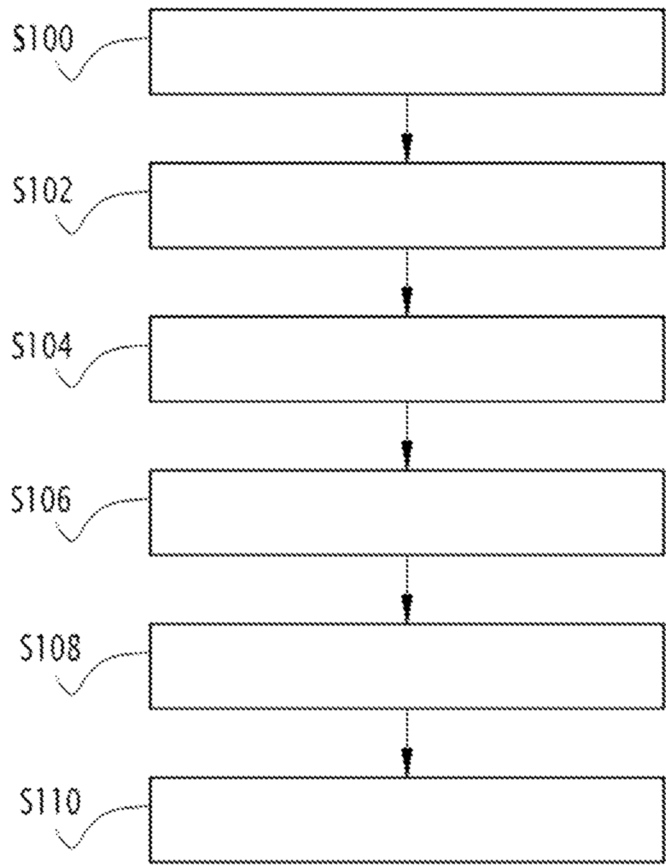
FIG. 2 is a diagram of a method for automatically configuring a microgrid according to one embodiment.
Figure 3:
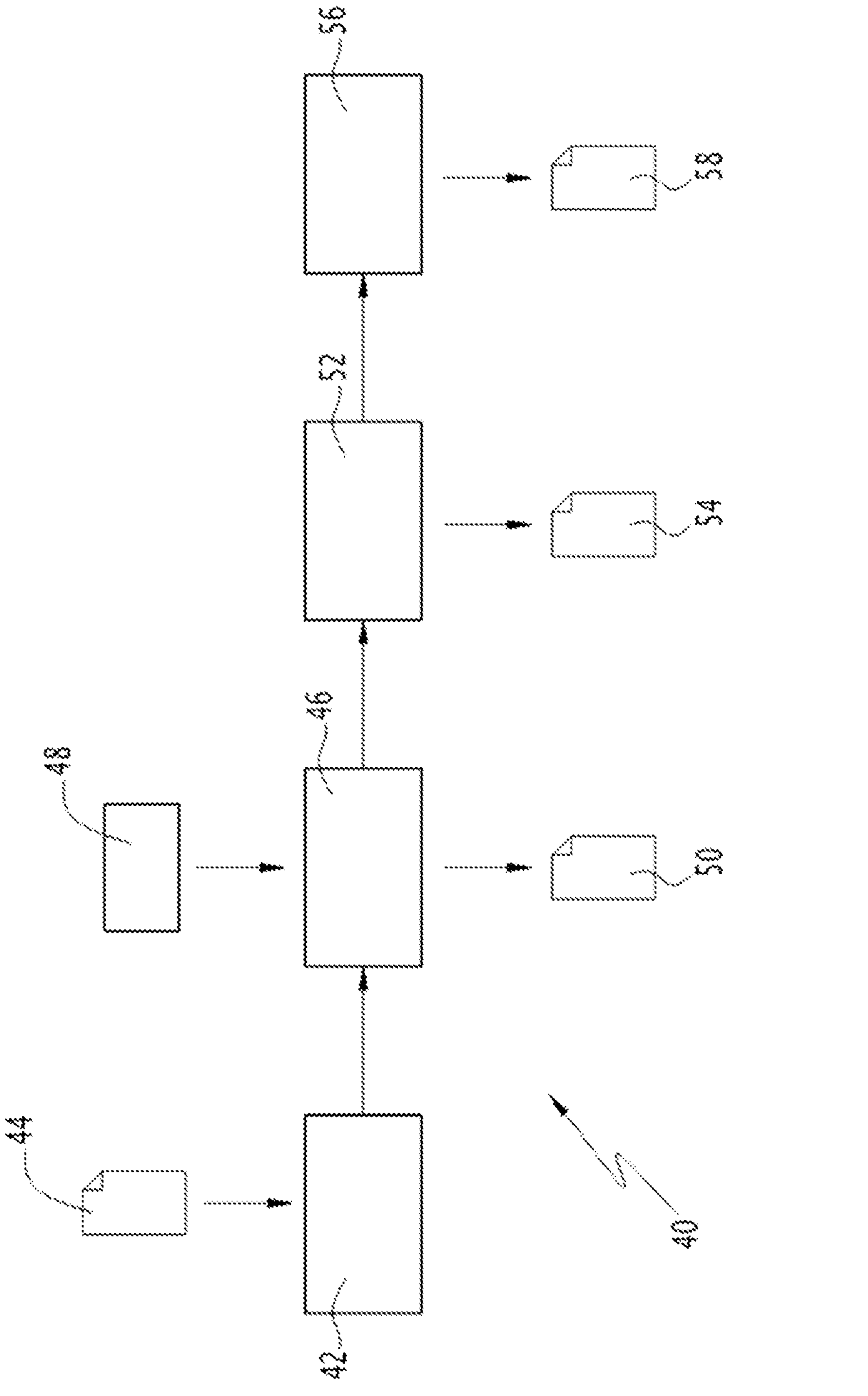
FIG. 3 is an overview of an implementation of the automatic configuration method of FIG. 2.

Some aspects of the invention relate more particularly to methods for automatically configuring a microgrid such as the microgrid 2, as illustrated by FIGS. 2 and 3.

The method starts in block S100 with a step of acquiring technical data describing properties of the microgrid 2. These technical data comprise for example a connection topology of the microgrid 2, technical properties of at least some of the equipment (electrical loads or electrical sources) connected to the microgrid 2, or even at least one usage scenario (or use case) of the microgrid 2.

For example, the data are input or provided (for example in the form of a configuration file) by an operator, for example on the computer terminal 26, by way of the interface 28.

In the overview of FIG. 3 showing an example of a system 40 for configuring the microgrid 2, an acquisition module 42 acquires the technical data 44 provided by the operator.

For example, the acquisition module 42 is implemented by software code executed by the server 30. In other words, the acquisition step is implemented here by the server 30, said server communicating with the terminal 26.

In many embodiments, the data are input or downloaded by the operator by way of a software configuration tool. This configuration tool may comprise a web interface hosted by the server 30 (or by another server connected to the server 30) and be accessible from the terminal 26, for example by way of a web browser or a dedicated software application (or any other equivalent means) running on the terminal 26.

As a variant, however, in some implementations, the acquisition step could be performed directly by the terminal 26 using a locally installed configuration tool (the acquisition module 42 then being implemented by the terminal 26).

In many embodiments, the technical data acquired in step S100 may comprise one or more of the following technical parameters relating to the architecture of the microgrid 2:
- the electrical topology of the microgrid 2;
- expected nominal voltage levels (for example the maximum amplitude or the root mean square value) when the microgrid is operating;
- a list of electrical switching devices, and in particular of disconnection devices, such as contactors and circuit breakers, and the characteristics thereof.

The technical data acquired in step S100 may comprise one or more of the technical parameters, listed below, relating to the energy sources connected to the microgrid 2, in particular to the decentralized energy sources 12, 14, 16:
- the number of sources able to produce or store or more generally to provide electricity;
- an identifier of each electrical source of the microgrid 2;
- the nominal electric power of the electrical sources;
- the minimum permissible charge level and the available energy level, in the case of storage devices such as batteries;
- the minimum operating level, in the case of a generator such as a generator set;
- in the case of a rotating machine (generator, converter, turbine, etc.), mechanical parameters such as nominal rotational speed, frequency, wear state of moving parts;
- the nominal characteristics of solar panels and/or photovoltaic cells, if applicable (current, voltage, etc.);
- a list of sheddable electrical loads, and the priority level of each electrical load (indicating for example whether an electrical load is able to be shed as a priority, or if it is of such importance that it is able to be shed only as a last resort).

The technical data acquired in step S100 may comprise technical parameters relating to the communication links 24 of the microgrid 2, such as the type of communication link, in particular the type of data bus, or the topology of the grid used, and information relating to the communication protocol used, and/or to the nature of the information transiting or able to transit over the link 24.

According to many embodiments, the acquired parameters may be provided in the form of a configuration file or of a database, or more generally by a structured data storage medium such as a relational database, or a structured data file, such as an XML ("Extensible Markup Language") file or a JSON ("JavaScript Object Notation") file, or any other appropriate data structure or technology.

Next, in block S102, the method comprises a step of creating, on the basis of the acquired technical data, a set 50 of driving algorithms corresponding to functions able to be executed by the controller 18 in order to drive one or more devices or items of equipment of the microgrid 2.

A set of algorithms in this case denotes one or more executable software functions or methods that are able to be implemented by a processor of the controller 18. These algorithms are preferably generated in the form of executable instructions or of compiled software code.

In the overview of FIG. 3, an algorithm generation module 46 automatically constructs the set of algorithms 50 on the basis of the technical data acquired in step S100 and on the basis of a digital library 48 of software functions. Example of software functions of the digital library 48 include engineering models of energy sources, including generation, storage and demand resources. As a more specific example, one software function can relate to the operation of an energy storage device of the microgrid.

For example, the algorithm generation module 46 is implemented by software code executed by the server 30. In other words, the acquisition step is implemented here by the server 30. However, in variants in which step S100 is implemented by the terminal 26, then step S102 may also be implemented by the terminal 26, provided that said terminal has access to the library 48.

For example, the library 48 is hosted by the server 30. The content thereof is thus not freely accessible to the operator from the terminal 26 or to the end user on the microgrid 2. The library 48 may thus contain proprietary functions that are not disclosed.

This makes it possible to adapt to the particular features of each microgrid 2, since the settings of these devices are highly dependent on the nature and type of electrical loads and electrical sources present in the installation and the way in which these sources and loads are interconnected with one another.

This also makes it possible to embed only information necessary for the microgrid, and thus not to be obliged to include data and functionalities relating to devices that are not present in the microgrid, as would be the case if generic and non-customized settings and algorithms were to be deployed on the microgrid 2.

As a variant, if multiple usage scenarios (or use cases) have been defined by the operator in step S100, then different functions, but also different parameters and different settings, could be defined in step S102 for each of these use cases.

For example, the functionalities implemented by the generated algorithms may comprise:
- ensuring the stability of the microgrid (in terms of frequency and in terms of voltage), in particular when the microgrid operates in isolated mode (for example, by sending active and reactive electric power setpoints for each electrical load or source, these setpoints being able to be calculated based on operating parameters of the equipment, such as the operating speed of rotating machines);
- automatically managing the sequences of operations to be implemented to change from isolated mode to connected mode (possibly comprising for example shedding electrical loads, selectively activating or deactivating storage devices, driving switching devices so as to ensure reconnection to the main grid) with or without loss of voltage;
- establishing a communication protocol between the control system and the local energy sources via the link 24.

It will be understood that these functionalities are given by way of example and that, as a variant, other functions could be implemented, and in particular functionalities linked to the management of the energy sources 12 to 16 and, possibly, the reversible electrical loads 6.

For example, some functions relating to electrical protection may make it possible to define at least one trip threshold value that is defined automatically for each protection device, based on the nature of the loads and the electrical sources present in the microgrid 2, but also based on the way in which they are interconnected, and on the location of said protection device in the microgrid, this information having been obtained in step S100.

It is also possible to define selectivity parameters for the protection devices when multiple protection devices are connected in cascade in the microgrid 2.

Next, in block S104, the method comprises a step of installing generated functions in the controller 18. For example, the set of generated functions is transmitted automatically from the terminal 26 to the controller 18 by way of a communication link. The controller 18 automatically receives the generated algorithms and installs them automatically, for example in a computer memory.

As a variant, step S104 may comprise sending technical information to the controller 18, allowing the controller 18 to automatically drive the operation of the connected devices, such as settings and operating parameters of various devices (in particular of protection devices such as circuit breakers) of the microgrid 2, these data possibly forming part of those acquired in step S100.

During operation of the microgrid 2, the functions defined in the set 50 are loaded and used by the controller 18, in particular according to the use case that is chosen or required by the circumstances.

For example, one use case may be selected automatically from among multiple possible predefined use cases, based on operating conditions of the microgrid or based on external parameters (such as for example the load or the state of the grid 10, the time of day, environmental conditions affecting the availability of one or more energy sources, etc.), these external parameters preferably being able to be measured or acquired automatically by the controller 18.

Next, in block S106, the method may optionally comprise a step of automatically generating a second set of algorithms that make it possible to optimize the consumption of the microgrid 2 when the microgrid is connected to the grid 10.

For example, these algorithms may implement functionalities such as:

- managing electricity consumption and/or production of the microgrid based on the pricing policy applied by a manager of the main grid 10, in particular when the cost of electricity provided by the grid 10 varies over time (for example reducing consumption and/or increasing local electricity production when prices increase);
- managing electrical consumption and/or local electrical production in peak periods ("peak shaving");
- prohibiting the exportation of electrical energy to the main grid 10;
- promoting self-consumption of produced electricity (for example by promoting the consumption and/or the storage of electricity produced by photovoltaic panels when these are present in the microgrid 2).

In this case too, these algorithms are preferably generated in the form of executable instructions or of compiled software code. These algorithms may be selected from pre-existing databases.

In the overview of FIG. 3, an algorithm generation module 52 automatically constructs the second set of algorithms 54 on the basis of the technical data received in step S100. For example, the algorithm generation module 52 is implemented by software code executed by the terminal 26 or by the server 30. These algorithms may then be executed by the server 30 or by the terminal 20 during operation of the microgrid 2.

Next, in block S108, the method may optionally comprise a step of automatically creating a human/machine interface on the basis of the acquired technical data, this step comprising in particular generating a schematic graphical representation of the microgrid 2.

In the overview of FIG. 3, a graphical interface generation module 56 automatically constructs a graphical interface 58 on the basis of the technical data contained in the received database.

For example, the graphical interface generation module 56 is implemented by software code executed by the terminal 26 or by the server 30 (the data relating to the presentation of the graphical interface then being transmitted to the terminal 26).

Figure 4:
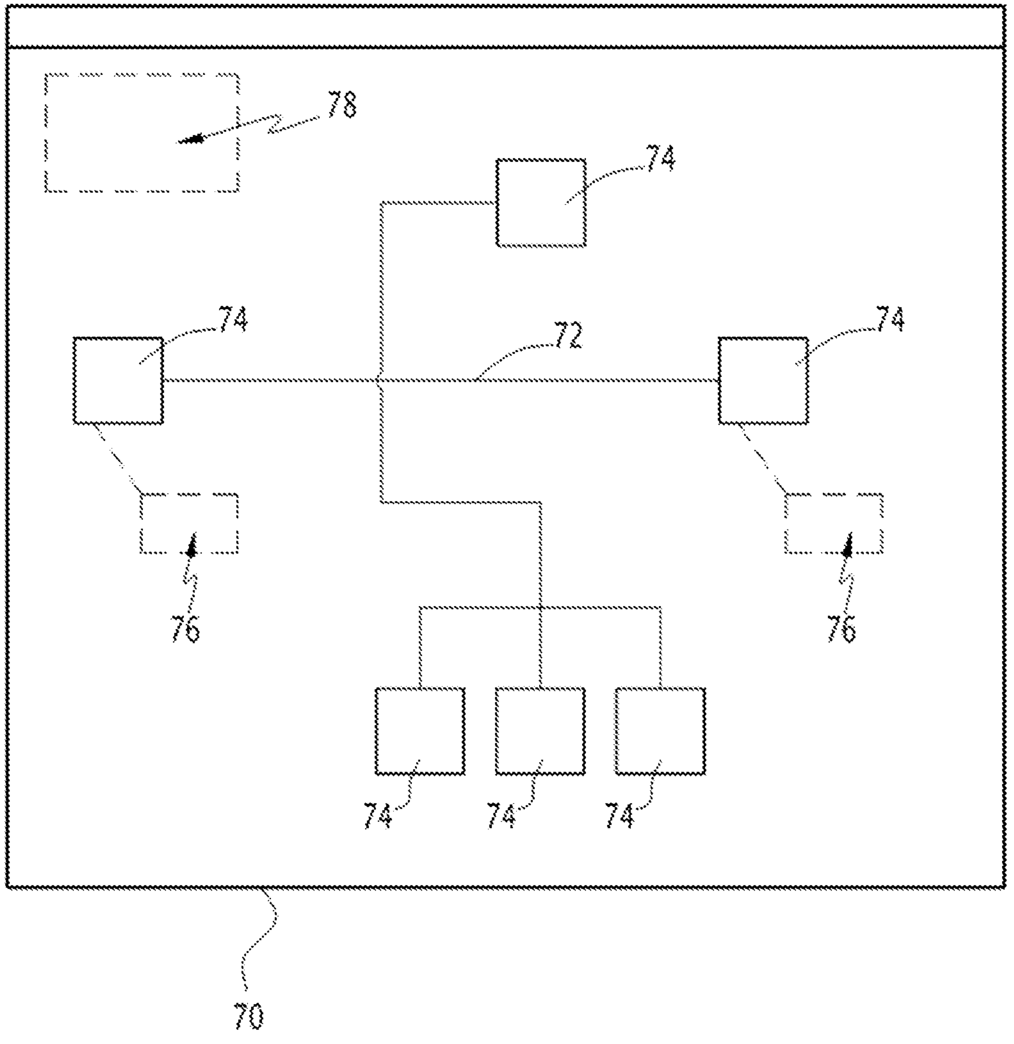
FIG. 4 is a schematic depiction of an example of a graphical interface generated by the automatic configuration method of FIG. 2.

FIG. 4 shows an example of a graphical interface generated automatically in step S108.

In practice, the graphical interface 70 is intended to be displayed on a screen of a computer terminal, for example intended for an operator responsible for monitoring the correct operation of the microgrid 2, be this on the local interface 22 or remotely on a web interface generated by the terminal 20 or by the server 30 (on the basis of information from the microgrid 2 control system).

The graphical interface 70 comprises multiple graphical symbols arranged on a background, these symbols being chosen and arranged spatially with respect to one another based on the input data, for example based on the topology of the microgrid 2, but also based on the characteristics of the equipment of the microgrid 2 as filled in in the database 50.

In the example illustrated, the interface 70 comprises lines 72 symbolizing the electrical interconnections in the microgrid 2, and icons 74 representing all or some of the equipment of the microgrid 2.

The icons 74 are connected by portions of lines 72, in an arrangement representative of the way in which the corresponding electrical devices are connected in the microgrid 2.

For example, the icons 74 are chosen from a predefined list or a library of graphical symbols, each icon being associated with an equipment type (load, source, switching device, protection device, etc.) representative of the nature of this equipment.

Display areas 76, 78 situated at various locations of the interface 70 are provided in order to display data representative of the operating state of devices of the microgrid 2, and/or of the microgrid 2 itself. These data may be displayed in numerical or alphanumeric form, in the form of symbols or pictograms, or in any appropriate combination or presentation.

For example, first display areas 76 may be associated with icons 74 for displaying data relating to an item of equipment of the microgrid 2 in a more specific manner. One or more second display areas 78 may display data relating to the entire microgrid 2 in a more specific manner, without however being associated with one item of equipment in particular.

Although not illustrated in FIG. 4, some display areas may also be associated with the lines 72, for example in order to display information relating to the state of an electrical conductor or information relating to the electric currents flowing through this electrical conductor.

It will therefore be understood that only the necessary elements that are actually present in the grid are displayed.

This example of a graphical interface 70 is obviously not limiting, and could be presented differently, depending on the nature of the microgrid 2 and the presentation choices made by the installer.

Returning to FIG. 2, in block S110, the method may optionally comprise a step of automatically configuring the communication links 24.

In the overview of FIG. 3, a configuration module 56 automatically defines settings and configuration data on the basis of the technical data contained in the received database. For example, the configuration module 56 is implemented by software code executed by the controller 18 and/or by the terminal 20.

These settings and these parameters are then applied to the various communication interfaces connected to the link 24.

In general, the generated settings and parameters make it possible to configure the link 24 so as to authorize communication between the microgrid 2 control system (in particular, the controller 18 and the terminal 20) and the flexible electrical loads 6 and the driveable electrical sources (or even, where applicable, the switching devices interconnecting the microgrid 2 with the main grid 10).

Configuration step S110 may comprise, without limitation, operations of automatically defining, based on the data acquired in step S100:

the addresses of the connected equipment, in particular network addresses;

the communication parameters between them (for example based on the nature and/or the topology of the link 24 and/or the communication protocols used);

the (read and/or write) access rights to each of the connected items of equipment.

It goes without saying that, as a variant, the multiple steps described above could be carried out in a different order. Certain steps could be omitted. The described example does not prevent, in other embodiments, other steps from being implemented conjointly and/or sequentially with the described steps.

By virtue of the invention, an electricity distribution microgrid is able to be configured quickly, easily and in an automated manner.

The embodiments of the methods and systems described above make it possible to program all or some of the functionalities of control systems responsible for driving and supervising the microgrid 2 automatically and in a customized manner in order to take account of the specific features of the microgrid 2.

In particular, the trickiest setting operations, such as setting the parameters of the protection devices, defining specific protection plans, and adapting the supervision and driving functions implemented by the controller 18 to the specific topology of the microgrid 2, are automated and may take place without systematically requiring the on-site intervention of a specialist installer.

The embodiments and the variants contemplated above may be combined with one another so as to create new embodiments.

The invention claimed is:

1. A method for automatically configuring an electricity distribution microgrid, the microgrid comprising electrical conductors configured to connect electrical loads and local electrical energy sources, the method comprising:

acquiring technical data describing properties of the microgrid and properties of at least some electrical equipment connected to the microgrid, by way of a software configuration tool implemented by a remote computer server, the properties of the microgrid comprising the topology of the microgrid;

automatically generating a set of executable software functions including a set of driving algorithms configured to automatically drive the equipment of the microgrid, wherein:

the driving algorithms are generated by selecting, from a digital library of proprietary software functions and on the basis of the acquired technical data, only those proprietary software functions that are related to the electrical equipment connected to the microgrid, and at least one of the generated driving algorithms of the set of driving algorithms is configured to ensure stability of the microgrid in terms of frequency and in terms of voltage;

automatically installing the software functions generated on an electronic controller belonging to a microgrid control system for causing the electronic controller to be automatically configured to automatically drive the equipment of the microgrid, the controller being connected to said equipment via a communication link; and automatically generating a set of optimization algorithms by selecting, from a pre-existing database and on the basis of the acquired technical data, the set of optimization algorithms configured to optimize consumption of the microgrid.

2. The method according to claim 1, wherein the generated software functions are configured to be executed by the controller for causing the controller to configure electrical protection devices installed in the microgrid, including setting parameters of the electrical protection devices or calculating protection plans for use by the electrical protection devices, and further for causing the controller to drive the electrical protection devices.

3. The method according to claim 1, wherein the generated software functions are configured to be executed by the controller for causing the controller to automatically manage sequences of operations to be implemented to change from an isolated mode, in which the microgrid is disconnected from an electricity distribution grid, to a connected mode, in which the microgrid is connected to an electricity distribution grid.

4. The method according to claim 1, wherein the method further comprises automatically creating a human/machine interface on the basis of the acquired technical data.

5. The method according to claim 1, wherein the method further comprises automatically generating settings and parameters for configuring the communication link on the basis of the acquired technical data and at least another one of the generated software functions establishing a communication protocol for use between the control system and the local energy sources via the communication link.

6. The method according to claim 1, wherein the electrical equipment connected to the microgrid comprises one or more reversible electrical loads and/or one or more energy storage devices and/or one or more renewable energy production devices.

7. The method according to claim 1, wherein the electronic controller is a programmable logic controller or an industrial personal computer.

8. The method of claim 1, wherein the properties of the microgrid further comprise one or more use cases selected automatically by the controller from multiple possible predefined use cases.

9. The method of claim 1, wherein the at least one of the generated driving algorithms is configured to ensure the stability of the microgrid in terms of frequency and in terms of voltage in association with the microgrid operating in isolated mode.

10. The method of claim 1, wherein the equipment of the microgrid that is automatically driven includes driveable electrical sources.

11. A system for automatically configuring an electricity distribution microgrid, the microgrid comprising electrical conductors configured to connect electrical loads and local electrical energy sources, the system comprising:

a software configuration tool implemented by a remote computer server;

a microgrid control system, comprising an electronic controller connected to electrical equipment of the microgrid via a communication link; and wherein the configuration system is programmed for:

acquiring technical data describing properties of the microgrid and properties of at least some electrical equipment connected to the microgrid, by way of the configuration tool, the properties of the microgrid comprising the topology of the microgrid;

automatically generating a set of executable software functions including a set of driving algorithms configured to automatically drive the equipment of the microgrid, wherein:

the driving algorithms are generated by selecting, from a digital library of proprietary software functions and on the basis of the acquired technical data, only those proprietary software functions that are related to the electrical equipment connected to the microgrid, and at least one of the generated driving algorithms of the set of driving algorithms is configured to ensure stability of the microgrid in terms of frequency and in terms of voltage;

automatically installing the generated software functions on the electronic controller for causing the electronic controller to be automatically configured to automatically drive the equipment of the microgrid; and automatically generating a set of optimization algorithms by selecting, from a pre-existing database and on the basis of the acquired technical data, the set of optimization algorithms configured to optimize consumption of the microgrid when the microgrid is connected to a distribution network of electricity.

* * * * *